May 7, 1968 J. H. ANINGER 3,381,330
CASTERS
Filed May 2, 1966

INVENTOR:
JOHN H. ANINGER

United States Patent Office 3,381,330
Patented May 7, 1968

3,381,330
CASTERS
John H. Aninger, 2031 S. Beverly Glen Blvd.,
Los Angeles, Calif. 90025
Filed May 2, 1966, Ser. No. 546,829
3 Claims. (Cl. 16—21)

ABSTRACT OF THE DISCLOSURE

The subjects of this invention are improved casters for use with portable equipment, instruments and furniture, which are suitable for mounting during and after the production of the aforementioned pieces of equipment, selectively.

The subject of this invention is a caster constituting a further improvement over that covered in my copending application Ser. No. 499,767 (Series 1960), filing date Oct. 21, 1965.

The results obtained from various technical developments of the initially conceived caster construction and from tests conducted on the prototypes indicated not only the feasibility of the following advances but also their improved and simplified manufacture and assembly, combined with superior performance and reduced production cost compared to those caster varieties of the senior disclosure. Specific additional and advantageous characteristics of the improved caster construction will become more apparent from the specification and the accompanying drawing.

Figure 1:
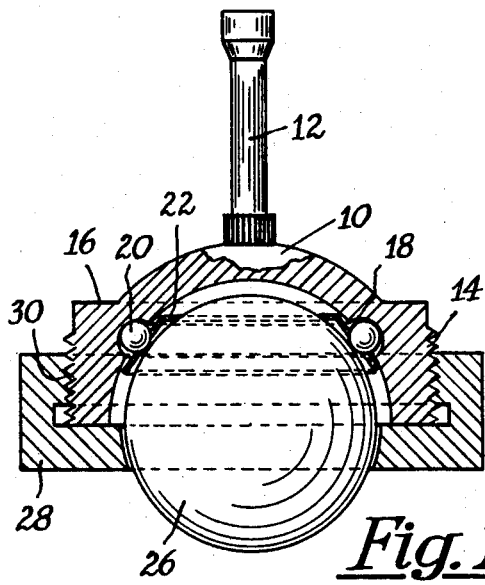
Figure 3:
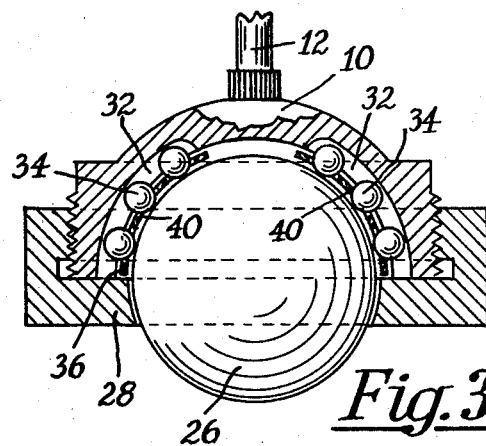
Figure 2:
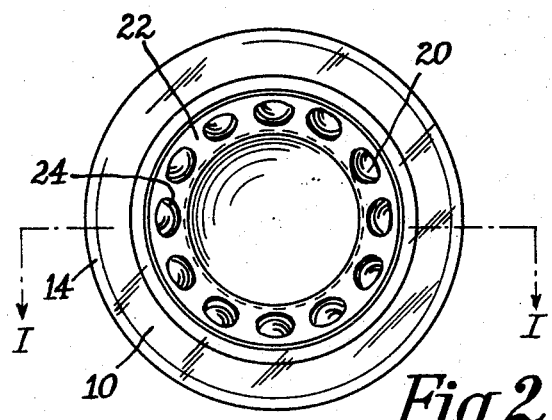
Figure 4:
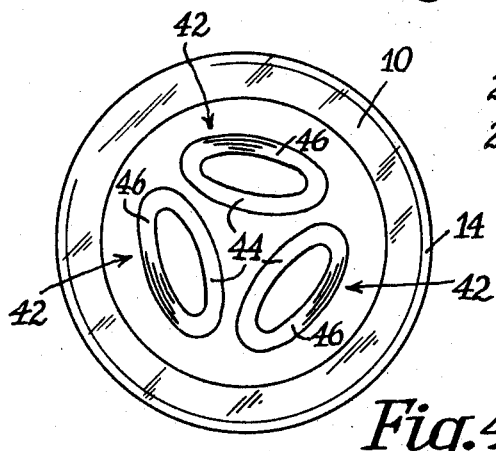
Figure 5:
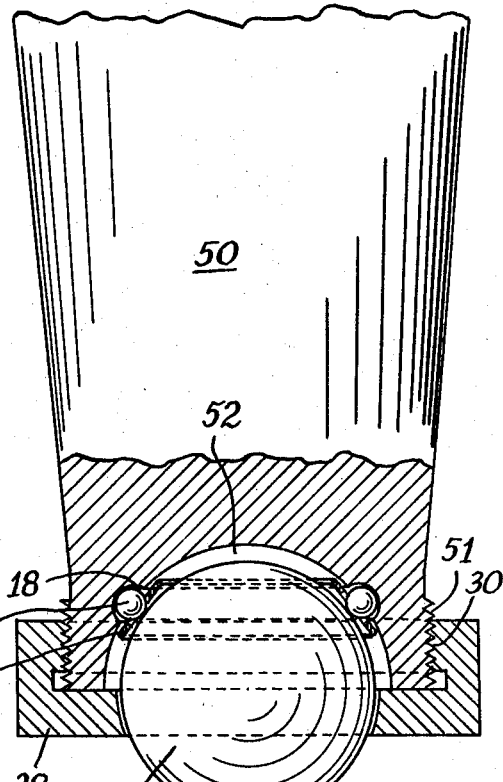

In this drawing, forming a part of this application, FIG. 1 shows, in the cross-sectional plane I—I, an elevational view of the improved caster construction, FIG. 2 is a bottom view of the caster housing including the anti-friction means assembly, FIG. 3 portrays, in cross-sectional elevation, a caster assembly having improved anti-friction means, FIG. 4 illustrates, in bottom view, a caster housing equipped with endless races for the anti-friction means, and FIG. 5 shows a caster construction, in elevational cross-section, as an integral part of a furniture extremity.

Referring now to the drawing, wherein like reference numerals designate like or corresponding parts, and particularly FIG. 1, the semi-spherical caster housing 10 has on its top the mounting stem 12 for the insertion in combination with a positioning shell (not shown) into an extremity of a furniture, instrument, or other portable equipment. The housing has an external thread at the portion 14 across the housing perimeter, and an annular, horizontal flat surface 16 near its top serving as a support for the leg of the portable equipment. A semitoroidally, downwardly facing, open-shaped race 18 is formed into the interior of the caster housing so as to be positioned horizontally with respect to its operational plane. This race 18 may be formed through a lateral and a radial generix, respectively. A plurality of anti-friction means, like the balls 20, are placed into the race 18, obviously while the caster housing is arranged in an assembly position upside-down with respect to that shown in FIG. 1. The balls 20 are spaced from each other adequately so as to allow for the insertion of a cage 22. This cage 22, as is known in the art, precludes the jamming of the balls 20 and preserves the required degrees of freedom for each such ball during the operation of the caster upon the movement of the object on which it is used for the transportation of the latter. The cage 22 chosen for this illustration consists of an annular tapered ring of a material having self-lubricating properties and a plurality of holes 24 formed therein, each said hole 24 having a diameter adapted to accommodate one of said balls 20 with adequate equatorial play. This condition may be observed with greater clarity in FIG. 2. The insertion of the sphere 26 and the application of the gland 28 having a tapped ring portion 30 so as to engage the externally-threaded housing portion 14, complete the caster assembly.

The improvement obtained through the employment of a cage separating the balls may be applied to the caster variety having, at least, three semi-toroidal grooves formed, along housing meridians, into the inside material portion of the caster housing, each occupied by a plurality of balls, as was shown in FIG. 3 of the referenced copending application. The respective construction is shown also in FIG. 3 of this application. Two semi-toroidal grooves 32, formed in the aforementioned manner into the caster housing 10, are shown in the drawing plane. A plurality of balls 34 is inserted into each such groove 32, whereby each such ball is spaced from each other. These spacings are maintained by means of a cage 36 for each groove 32 which, in this style, consists of a band of a material having self-lubricating properties; holes 40 are formed within said cage 36 so as to allow for the retention of only one ball 34 within each hole 40 of the cage 36. The sphere 26 and the gland 28 complement this caster assembly.

The various ball and race improvements can be further advanced through the arrangement of endless races within the interior of the caster housing. Caster constructions of this type may be desirable for the moving of especially heavy equipment, or for complex and frequent movements of general implements carried by said casters. A representative, endless ball race arrangement is illustrated in FIG. 4. In this caster-housing bottom view, three endless races 42 are formed into the housing material. It should be noted that the locus of one portion 44 of each said race 42 is concentric with the sphere 26 about one radius, whereas the locus of the other race portion 46 is generated about a concentric radius which is larger than that of the locus for the race portion 44. Consequently, the sphere 26 is supported only by those balls (not shown in FIG. 4) which are in the race portion 44, clearing the balls which are in the race portions 46 for their unloaded return to the active race portion 44. The cage constructions for endless races vary in accordance with the race geometry. Circular races may employ cages of the type 22 shown in FIGURES 1 and 2 of this drawing. Flexible, round bar stock formed in a wave-shaped loop so as to encompass every other ball on one side and the interposed balls on the other side will be the adequate cage choice for any other than circular race layout. This cage variety will also be captive between said balls, the caster housing and the sphere, respectively. To improve the performance, the material for the flexible, round bar stock should have self-lubricating characteristics.

Contrary to conventional caster assemblies, caster constructions described and shown herein as well as in the referenced, copending application can readily be incorporated into legs and other extremities of portable furniture and equipment. One possible structure of this kind is illustrated in FIG. 5, wherein the caster variety shown in FIG. 1 of this application and drawing has been utilized. The furniture leg 50, having a threaded portion 51 on its outside, was adapted to contain a semi-spherical, downwardly facing open port 52, having a race 18 formed therein. A plurality of balls 20 is deposited in said race 18. A cage 22, made of a material having self-lubricating properties, is placed upon said balls 20, spacing each said ball from each adjacent ball under adequate play. The sphere 26 is assembled to the foregoing by means of the gland 28 having a tapped portion 30 so as to engage the externally-threaded leg portion 51.

It is understood that the herein described caster constructions, designs and parts constitute but representative embodiments and that numerous modifications, altera-

What is claimed is:

1. A caster having a housing made of a first material having a downwardly-facing semi-spherical open port formed therein, a mounting stem extending exteriorly and upwardly from said housing, a cylindrical, externally-threaded portion along the equatorial perimeter of said semi-spherical port, a sphere made of a second material lodged within said downwardly facing open port having a diameter smaller than the diameter of said semi-spherical port, an annular gland having a cylindrical, internally-threaded portion along its perimeter, its hole formed therein having a diameter smaller than the diameter of said sphere, said gland fastened to said housing by means of said threaded portions so as to retain said sphere movably within said housing, comprising: a circular endless race formed into the interior of said housing along a parallel of said semi-spherical port, said parallel being located in a plane between the polar and the equatorial position of said semi-spherical port, said circular endless race adapted to accommodate anti-friction means, a plurality of balls made of a first, a second and a third material, selectively, being disposed in said circular race, a cage constructed of an annular, tapered band of a material having self-lubricating properties, said cage having a plurality of holes formed therein located along a circular locus between its outer and inner edge, each said hole being adapted to accommodate a portion of one said ball with adequate clearance and to impart a spacing between any adjacent said balls.

2. A caster as defined in claim 1, wherein said cage is constructed of a flexible bar stock having self-lubricating characteristics formed in an endless, wave-shaped loop adapted to encompass with adequate clearance a portion of every other said ball within one side of each said wave and a portion of each interposed said ball within the other side of each said wave so as to impart a spacing between any adjacent said balls.

3. A caster as defined in claim 1, wherein a plurality of endless races is formed into said downwardly-facing, semi-spherical port, said races being arranged in a random pattern throughout the surface of said semi-spherical port, each said race having a first race portion generated about an arcuate locus defined by a first radius and concentric with said sphere, and a second race portion generated about a second arcuate locus defined by a second radius and concentric with said sphere, whereby said second radius is larger than said first radius, and a transition race portion between each said first and each said second race portion so as to merge each said first race portion smoothly with each said second race portion, a cage provided for each said endless race constructed of an annular tapered band of a material having self-lubricating properties, equipped with a plurality of holes formed therein about a circular locus being between its outer and inner edge, each said hole being adapted to accommodate a portion of one said ball with adequate clearance imparting a spacing between any two adjacent said balls, and with a cage constructed of a flexible bar stock having self-lubricating characteristics formed in an endless, wave-shaped loop adapted to encompass with adequate clearance a portion of every other said ball within one side of each said wave and a portion of each interposed said ball within the other side of each said wave so as to impart a spacing between any adjacent said balls, selectively.

References Cited

UNITED STATES PATENTS

| | | | |
|---|---|---|---|
| 1,139,271 | 5/1915 | Gray | 16—26 |
| 1,233,093 | 7/1917 | Malloy | 16—36 |
| 1,582,795 | 4/1926 | Smith | 16—26 |
| 2,034,509 | 3/1936 | De Haven | 16—26 |
| 613,352 | 11/1898 | Boveroux | 16—26 |

BOBBY R. GAY, *Primary Examiner.*

D. L. TROUTMAN, *Assistant Examiner.*